April 14, 1942.　　　O. S. JENNINGS　　　2,279,737
CIRCUIT BREAKER PROTECTIVE SYSTEM
Original Filed March 27, 1937
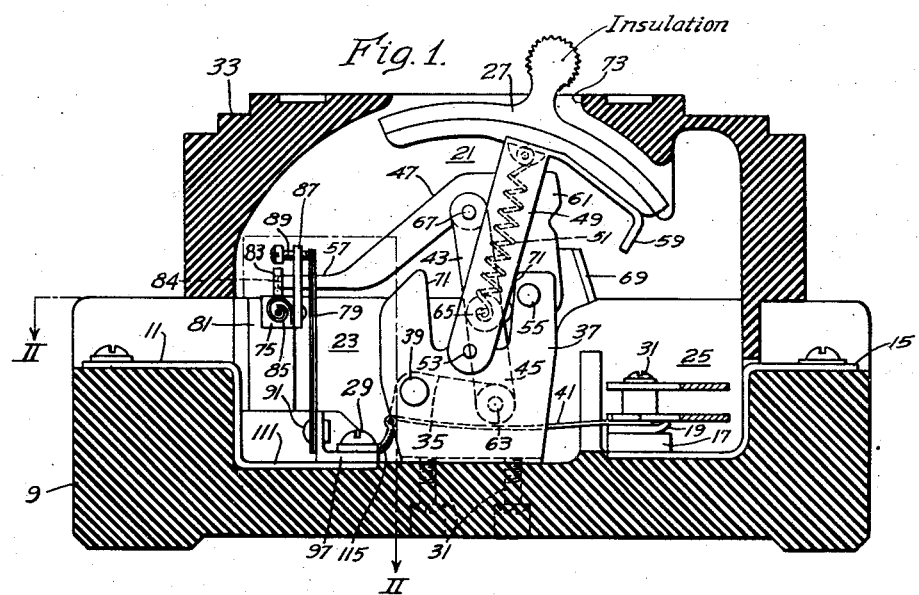
WITNESSES:
C. J. Weller.
G. S. Parker
INVENTOR
Oliver S. Jennings.
BY
Ralph H. Swingle
ATTORNEY Patented Apr. 14, 1942

2,279,737

UNITED STATES PATENT OFFICE 2,279,737

CIRCUIT BREAKER PROTECTIVE SYSTEM

Oliver S. Jennings, Pittsburgh, Pa., assignor to Westinghouse Electric & Manufacturing Company, East Pittsburgh, Pa., a corporation of Pennsylvania Application March 27, 1937, Serial No. 133,410
Renewed November 15, 1939

20 Claims. (Cl. 175—294)

The invention relates to electrical distribution systems, and more particularly, to circuit breakers for controlling lighting and moderate power distribution feeder circuits.

In interior wiring systems, each branch or loop circuit is usually connected to the main or feeder by a circuit interrupter which is disposed between the main or feeder and one end of the branch. With such an arrangement it is necessary to use the same size or capacity wire for each of the branch conductors as is used for the main, since each conductor of the branch may be called upon to carry full rated current. Also only the rated current of the circuit interrupter can be fed to the load devices. For example, if the rated current of the circuit interrupter is 15 amperes, the total load, which may comprise a plurality of lamps or other devices connected across the branch, cannot draw more than 15 amperes without causing automatic interruption of the circuit even though portions of the branch conductors may be carrying considerably less than the rated 15 amperes. Also no single load device can draw more than 15 amperes with all of the other load devices disconnected even though it is capable of safely carrying a greater load.

An object of the present invention is the provision of an improved electrical distribution system whereby with any given wire size for at least one of the conductors of a branch circuit considerably greater current can be safely fed to a load connected to the branch.

Another object of the invention is the provision of an improved interior wiring system or electrical distribution system whereby for any given load at least one of the conductors of the branch circuit may be of considerably smaller size or capacity and yet safely feed the load.

Another object of the invention is the provision of an improved electrical distribution or interior wiring system embodying circuit interrupting means connected to feed current at a plurality of different points into one conductor of a branch circuit.

Another object of the invention is the provision of an improved electrical distribution system embodying a plurality of current responsive elements operable upon overload to interrupt the circuit and having a common connection to the main or feeder circuit and connected at a plurality of different points to one conductor of the branch circuit.

Another object of the invention is the provision of an improved electrical distribution system embodying automatic circuit interrupting means connected to the main or feeder and to each end of at least one of the conductors of the branch circuit.

Another object of the invention is the provision of an improved electrical distribution system embodying a circuit breaker having a single set of contacts connected to feed current at a plurality of different points into one conductor of a branch circuit and having means operable upon overload of any portion of the conductor to cause automatic opening of the contacts.

Another object of the invention is the provision of an improved circuit breaker embodying a plurality of load terminals and a plurality of electroresponsive trip elements connected to a single pair of contacts for feeding current at a plurality of points into a single branch conductor and furnishing overload protection for all portions of the branch.

The novel features that are characteristic of the invention are set forth in particular in the appended claims. The invention itself, however, both as to structure and operation, together with additional objects and advantages thereof will best be understood from the following detailed description of several embodiments thereof when read in connection with the accompanying drawing in which:

Figure 1 is a vertical sectional view of a circuit breaker embodying the features of my invention;

Fig. 2 is a fragmentary plan view of a portion of the circuit breaker illustrating certain details of the trip mechanism and load terminal structure, taken on the line II—II of Fig. 1;

Fig. 3 is an elevational of the thermally responsive trip means embodied in the breaker shown in Fig. 1;

Fig. 4 is a fragmentary plan view similar to Fig. 2 showing one of the thermally responsive trip elements in operative position to effect a tripping operation;

Fig. 5 is a side elevational view of a modified form of thermally responsive trip means; and Fig. 6 is a schematic wiring diagram illustrating the electrical connection of the breaker when used to control a branch or loop circuit.

Referring to Fig. 1, the base 9 of the circuit breaker is of molded insulating material and has mounted in recesses provided therein a pair of load terminals 11 and 13, a single line terminal 15, a stationary contact 17, a movable contact 19, operating means indicated generally at 21, electro-responsive tripping mechanism indicated generally at 23 and an arc-extinguishing means 25. An operating handle 27 also of molded insulating material is provided for actuating the operating mechanism 21. The electro-responsive trip elements of the trip mechanism are supported on the base 9 and positioned with respect to the operating mechanism by means of suitable screws 29 which engage threaded inserts (not shown) molded in the base 9. These screws also serve to connect the trip elements of the trip mechanism in the internal circuit of the breaker, as will be described hereinafter.

The arc extinguishing means and the operating mechanism are secured to the base in any suitable manner as, for example, by screws 31. A cover 33 of molded insulating material is removably mounted on the base by means of bolts (not shown). The movable contact 19 has a channel-shaped frame 35 which is pivotally supported on a U-shaped main frame 37 through the agency of a pivot pin 39. The movable contact 19 is rigidly affixed by means of a rivet to a resilient switch arm 41 which is preferably constructed of spring steel. The switch arm is in turn secured to the channel-shaped contact frame 35 by means of two other rivets.

The operating mechanism is of the same general construction as disclosed in the United States Patent No. 2,044,157, granted June 16, 1936, to H. D. Dorfman and John H. Shuler and assigned to the assignee of this invention, hence only a brief description of the same will be given in this application.

The operating mechanism 21 comprises, in general, a U-shaped base or main frame 37, a pair of toggle links 43 and 45 for actuating the channel-shaped contact frame 35, a releasable actuating member 47 for restraining the toggle links in an operative position, an operating member 49, and a pair of overcenter springs 51 (only one being shown) for connecting the operating member to the knee pivot of the toggle links 43 and 45. The operating member 49 has a bifurcated portion, the legs of which are pivotally mounted on the sides of the main frame 37 through the agency of a pivot pin 53. The releasable actuating member 47 is pivotally mounted at one end to the sides of the main frame 37 by means of a pivot pin 55 and has a projecting portion 57 adapted to be engaged and held by a latch of the tripping mechanism 23.

The operating member 49 has a hook portion 59 secured to the under side thereof which is adapted to engage a shoulder 61 formed on the actuating member 47 for resetting the actuating member after the release of the same by the trip mechanism following a tripping operation. The lower end of the toggle link 45 is pivoted to the channel-shaped contact frame 35 by means of a pivot pin 63. The upper end of the toggle link 45 is pivotally connected by means of a knee pivot pin 65 to the lower end of the upper toggle link 43, the upper end of which is in turn pivotally connected to the actuating member 47 through the agency of a pivot pin 67.

The overcenter springs 51 have their lower ends connected to the knee pivot pin 65 and their upper ends secured to lugs provided on the under side of the bight of the bifurcated portion of the operating member 49, as shown in Fig. 1. The actuating member 47 is biased in a clockwise direction by a component of the force exerted by the overcenter springs 51, and when the actuating member is latched in its normal position it provides a releasable restraining means for holding the toggle links in an operative position when the contacts 17 and 19 are engaged.

The movement of the actuating member 47 in a clockwise direction about its pivot pin 55 is limited by a projection 69 which extends inwardly from the one side of the main frame 37. The limits of motion of the operating member 49 are defined by the edges 71 of the offset portions of the side walls of the main frame 37. A handle portion of the operating handle projects through a slot 73 provided in the cover 33.

The trip mechanism comprises, in general, a pivoted trip bar 75 and a pair of current-carrying bimetallic trip elements 77 and 79. The trip bar is of molded insulating material, extends transversely across the base 9 of the breaker, and is pivotally supported by a pair of side plates 81 which are secured to the side walls of the breaker. The trip bar 75 is provided with an upwardly extending latch plate 83. The latch plate 83 has a vertical slot 84 for receiving the projecting end of the actuating member 47. The upper edge of the slot 84 is adapted to overlie the projecting end of the actuating member 47 so as to restrain the actuating member against clockwise movement. It should be noted that the point of engagement of the end of the actuating member 47 with the upper edge of the slot 84 of the latch plate 83, is positioned to the left of the pivot axis of the trip bar 75 so that the component of the force of the overcenter springs 51 transmitted to the actuating member 47 tends to bias the trip bar 75 and latch plate 83 carried thereby to latching position. The trip bar 75 is also biased to latching position by means of a coil spring 85 which acts to return the trip bar to latching position following release of the actuating member.

The trip bar is also provided with a pair of spaced upwardly projecting lugs 87, one for each of the bimetallic trip elements. The lugs 87 have screw threaded openings for receiving adjusting screws 89 which extend through the lugs and engage the free ends of the bimetallic trip elements. When either bimetallic trip element is flexed away from the operating mechanism in response to an overload or other predetermined condition, it engages its corresponding adjusting screw 89 and moves the trip bar in a counterclockwise direction to effect release of the actuating member 47.

Each of the bimetallic trip elements comprises a U-shaped strip of bimetallic material. The ends of the legs of the bimetallic trip element 77 are secured and electrically connected, by means of rivets 91, to an outer angular terminal bracket 93 and to a central common terminal bracket 95, respectively. Likewise, bimetallic trip element 79 has its leg secured and electrically connected, by means of rivets 91, to an outer angular terminal bracket 97 and to the central common terminal bracket 95, respectively. The terminal brackets 93, 95 and 97 are secured to the base 9 of the breaker through the agency of the screws 29 as previously described. The bimetallic trip elements 77 and 79 are thus mounted side by side so as to normally lie in the same vertical plane. The apex 99 of the bimetallic trip element 77 extends to a position adjacent one of the projecting lugs 87 of the trip bar 75, while the apex 103 of the bimetallic trip element 79 extends to a position adjacent the other projecting lug 87 of the trip bar 75.

The bimetallic trip elements 77 and 79 are disposed so that when heated a predetermined amount, they flex away from the operating mechanism 21 so as to move the trip bar 75 to released position.

The internal circuit connections of the breaker are as follows: The outside terminal bracket 87 of the trip element 79 is secured and electrically connected to an offset end 111 of the load terminal 11 through the agency of the screw 29. The outside terminal bracket 93 of the bimetallic trip element 77 is likewise secured and electrically connected to an offset end 113 of the load terminal 13. The central terminal bracket 95 which is electrically connected to one leg of each of the bimetallic trip elements 77 and 79 is connected by means of a flexible conductor 115 to the switch arm 41. The stationary contact 17 is secured in any suitable manner as by welding or brazing to the offset inner end of the line terminal 15, as shown in Fig. 1.

The switch arm 41 is thus connected in parallel with the two bimetallic trip elements 77 and 79 and their corresponding load terminals 13 and 11, respectively.

The circuit breaker is connected to control and protect a branch or loop circuit in a novel manner to provide an improved electrical distribution system or interior wiring system as shown in Fig. 6. Referring to Fig. 6, L1—L2 represents a main or feeder circuit, and B represents a branch or loop circuit energized from the main or feeder. The circuit breaker is indicated diagrammatically and has its line terminal 15 electrically connected by a conductor 121 to the conductor L1 of the main. The load terminals 11 and 13 of the breaker are connected to the opposite ends of one conductor B1 of the branch or loop circuit B. The opposite conductor B2 of the branch is connected to the conductor L2 of the main or feeder. A plurality of load devices 123 are shown connected across the conductors B1, B2 of the branch B. The load devices may comprise lamps, motor devices, heating devices, or any other current utilizing devices commonly connected to branch circuits. The circuit breaker thus feeds current into the conductor B1 at a plurality of points, namely, at the opposite ends thereof, and the current responsive trip elements 77 and 79 are designed to provide overload protection for each end or portion of the branch. As an example, if the conductor B1 of the branch is of a size capable of continuously carrying a maximum current of say 15 amperes, the trip elements 77 and 79 are each selected to trip the breaker when currents in excess of the rated 15 amperes flow therethrough. This means that a maximum current of 15 amperes can be fed into each end of the conductor B1 so that the load can draw a maximum of 30 amperes without tripping the breaker even though the conductor B1 is of 15 ampere capacity. The breaker will automatically open the circuit however if current in excess of 15 amperes flows through any portion of the conductor B1. The conductor B2, of course, must be capable of carrying a maximum current of 30 amperes.

Fig. 5 shows a slightly modified form of the bimetallic trip elements which may be used in place of the trip elements shown in Figs. 1 and 2. In this modification each of the bimetallic trip elements comprises a straight strip of bimetallic material, the lower ends of the strip being connected to an angular terminal bracket 95'. The load terminals of the breaker in this case are adapted to be connected to the free ends of the bimetallic strips 77' and 79' by means of flexible insulated conductors 117 and 119. The strips 77' and 79' are disposed in the same plane and project upwardly from the base at slight angles to the vertical so that the free ends are disposed adjacent the projecting lugs 87 of the trip bar 75 so as to engage the adjusting screws 89.

The operation of the circuit breaker itself will now be briefly described. In Fig. 1, the breaker is shown in the closed circuit position with the actuating member 47 in latched position in which it is held by the latch plate 83 of the tripping mechanism 23, the toggle links being in their extended position. It will be noted that the actuating member 47 is at all times biased in a clockwise direction by a component of the force exerted by the overcenter springs 51. Let it be assumed that it is desired to open the breaker. The operating handle 27 is moved from the position shown in Fig. 1 in a counter-clockwise direction about its pivot pin 53. Shortly before the operating handle has reached the limit of its travel in a counter-clockwise direction, the line of action of the overcenter springs 51 is brought to the left of the center line of the toggle. This results in producing a force which automatically moves the toggle links with increasing acceleration to their collapsed position which effects movement of the switch arm 41 and the movable contact 19 to the open circuit position with a snap action. To manually close the circuit breaker, the operating handle 27 is moved from the open circuit position in a clockwise direction about its pivot pin 53 to the closed circuit position shown in Fig. 1. Substantially the reverse action takes place. The line of action of the over-center springs 51 is moved to the right of the center line of the toggle, producing a force which automatically moves the toggle links with increasing acceleration to their extended or "in toggle" position, shown in Fig. 1. This movement of the toggle links effects movement of the switch arm 41 and the movable contact 19 to the closed circuit position with a snap action.

When the circuit breaker is in closed circuit position, and an overload of predetermined magnitude occurs in the conductor connected to either of the load terminals, the overload current heats the bimetallic trip element affected a sufficient amount to cause the same to flex in a direction away from the operating mechanism 21. Assuming that the overload of predetermined magnitude occurred in the conductor connected to the load terminal 11 and bimetallic trip element 79, the trip element 79 in flexing in a direction away from the operating mechanism, rotates the trip bar 75 in a counter-clockwise direction about its axis. The counter-clockwise movement of the trip bar 75 causes the latch plate 83 to disengage the end of the actuating member 47 to release the same. When released, the actuating member 47 is rotated in a clockwise direction about its pivot pin 55 by a component of the force exerted by the over-center springs 51. At a certain point in the clockwise rotation of the actuating member 47, the line of action of the over-center springs passes to the left of the pivot point 67 of the upper link 43 to the actuating member 47, and effects collapse of the toggle links. The collapse of the toggle links moves the switch arm 41 and the movable contact 19 to the open circuit position with a snap action. Similarly, if the overload occurred in the conductor connected to the load terminal 13 and the corresponding bimetallic trip element 77, the heat produced by the overload current in the bimetallic trip element 77 causes the same to flex in a direction away from the operating mechanism 21 to rotate the trip bar 75 in a counter-clockwise direction. The counter-clockwise rotation of the trip bar 75 effects release of the tripping member 47 to trip the breaker in the same manner as has been previously described.

After the bimetallic trip element cools, the trip bar 75 is returned to its normal latched position under the influence of the biasing spring 85. To reset the breaker the operating handle 27 must be moved to the full open position, during which movement the hook portion 59 engages the shoulder 61 of the actuating member and moves the same in a counter-clockwise direction so as to reengage the projecting portion 57 under the upper edge of the slot 84 in the latch plate 83.

The bimetallic trip elements may be designed to have the same or different trip characteristics and/or time constants, to suit the particular requirements or use to which the breaker is put.

The adjusting screws 89 provide independent adjusting means for adjusting the trip characteristic or tripping point of each of the bimetallic trip elements.

The invention has been shown in connection with a single pole breaker. It is obvious, however, that the same principles can be applied to a multi-pole circuit breaker in which case a plurality of bimetallic trip elements would be provided for each set of contacts of the breaker.

While the invention has been shown and described in accordance with the provisions of the patent statutes, it is to be understood that various changes in the structural details thereof may be made without departing from the spirit of the invention. It is desired therefore that the invention be limited only by the reasonable construction of the appended claims and by the prior art.

I claim as my invention:

1. In an electrical distribution system, a main, a branch having at least one load device connected thereto, circuit interrupting means electrically connected to said main and electrically connected at a plurality of different points to one conductor of said branch for feeding current to said load device, said points being on opposite sides of the point of connection of said load device to said branch.

2. In an electrical distribution system, a supply circuit, a branch circuit having at least one load device connected thereto, circuit interrupting means electrically connected to said supply circuit and electrically connected to the opposite ends of one conductor of said branch circuit for feeding current to said load device.

3. In an electrical distribution system, a main, a branch having a load device connected thereto, circuit interrupting means comprising a plurality of current responsive elements each having one terminal electrically connected to said main, the opposite terminals of said elements being electrically connected to one conductor of said branch at different remote points for feeding current to said load device, said elements each being operable upon overload to cause interruption of its circuit.

4. In an electrical distribution system, a supply circuit, a branch circuit, circuit interrupting means comprising a pair of current response elements each having one terminal electrically connected to one conductor of said main, the opposite terminals of said elements being electrically connected to the opposite ends of one conductor of said branch, said elements each being operable upon overload to cause interruption of its circuit.

5. In an electrical distribution system, a supply circuit, a branch circuit, circuit interrupting means electrically connected to one conductor of said supply circuit and at a plurality of different points to one conductor of said branch circuit for feeding current from said supply circuit into said one conductor of said branch circuit at said plurality of different points, said circuit interrupting means being operable upon overload of any portion of said branch circuit to cause interruption of the circuit.

6. In an electrical distribution system, a supply circuit, a branch circuit, circuit interrupting means electrically connected to one conductor of said supply circuit and at a plurality of different points to one conductor of said branch circuit for feeding current from said supply circuit into said one conductor of said branch circuit at said plurality of different points, said circuit interrupting means comprising a plurality of current responsive elements responsive to current flow through said plurality of points, each of said elements being operable upon overload of its portion of the circuit to cause interruption of its circuit.

7. In an electrical distribution system, a supply circuit, a branch circuit, circuit interrupting means electrically connected to one conductor of said supply circuit and to the opposite ends of one conductor of said branch circuit, said circuit interrupting means comprising a pair of current responsive elements, one of said elements being responsive to the current through one end of said one branch circuit conductor and the other element being responsive to the current through the other end of the same branch circuit conductor, each of said elements being operable upon overload current through the portion of the circuit to which it is responsive to cause interruption of its portion of the circuit.

8. In an electrical distribution system, a supply circuit, a branch circuit, a circuit breaker for controlling said branch circuit comprising a single pair of contacts one of which is electrically connected to one conductor of said supply circuit, a plurality of current responsive control elements connected at one end to the other of said pair of contacts and having their other ends electrically connected to different points of one conductor of said branch circuit, each of said elements being operable upon overload of its portion of the circuit to cause automatic opening of said pair of contacts.

9. In an electrical distribution system, a supply circuit, a branch circuit, a circuit breaker for controlling said branch circuit comprising a pair of relatively movable contacts one of which is connected to one conductor of the supply circuit, operating means for opening and closing said contacts, trip means including a pair of current responsive trip elements each having one terminal electrically connected to the other contact of said pair of contacts, the other terminals of said elements being electrically connected to the opposite ends of one conductor of said branch circuit whereby current is fed through said single pair of contacts and through both ends of said one conductor of the branch circuit.

10. In an electrical distribution system, a supply circuit, a branch circuit, a circuit breaker for controlling said branch circuit comprising a pair of relatively movable contacts one of which is electrically connected to one conductor of said supply circuit, operating means including a spring biased actuating member normally held in one position during normal operation of said contacts, said actuating member being releasable to effect automatic opening of said contacts, tripping means including a movable tripping member having a normal position in which it restrains said actuating member in said one position and movable to a tripping position to release said actuating member, a plurality of current responsive bimetallic trip elements having one terminal of each electrically connected to the other contact of said pair of contacts, the other terminals of said trip elements being connected to different points of one wire of said branch circuit whereby current is fed through said pair of contacts into said one wire at a plurality of different points, each of said trip elements being movable in response to overload of the portion of the circuit in which it is connected to move said tripping member to tripping position, and means for individually adjusting the trip characteristic of each of said trip elements.

11. In an electrical distribution system, a supply circuit, a branch circuit, a circuit breaker for controlling said branch circuit comprising a pair of relatively movable contacts one of which is electrically connected to one conductor of said supply circuit, operating means including a pair of current responsive thermal trip elements electrically connected at one end to the other contact of said pair of contacts, the other ends of said elements being electrically connected to the opposite ends of one wire of said branch circuit whereby current is fed through said pair of contacts into both ends of said one wire of the branch circuit, said trip elements each being operable in response to predetermined current conditions in its portion of the circuit to cause automatic opening of said contacts.

12. In an electrical distribution system, a supply circuit, a branch circuit, a circuit breaker for controlling said branch circuit comprising a pair of relatively movable contacts one of which is electrically connected to one conductor of said supply circuit, operating means including a plurality of current responsive control elements connected at one end to the other contact of said pair of contacts and having their other ends electrically connected at different points to one conductor of said branch circuit, each of said control elements being operable in response to predetermined current conditions in its portion of the circuit to cause automatic opening of said contacts, and means for individually adjusting the operating characteristic of each element.

13. In combination, a branch circuit, a circuit breaker for controlling the branch circuit comprising a pair of relatively movable contacts, operating means for opening and closing said contacts, a plurality of load terminals each electrically connected to the same one of said pair of contacts, a line terminal connected to the other of said pair of contacts, tripping means comprising a plurality of electroresponsive trip elements one for each load terminal each operable in response to predetermined values of current flowing through its corresponding load terminal to effect automatic opening of said pair of contacts, said load terminals being electrically connected to different points of one wire of the branch circuit whereby current is fed through said pair of contacts into said one wire of the branch circuit at a plurality of different points.

14. In combination, a branch circuit, a circuit breaker for controlling said branch circuit comprising a pair of relatively movable contacts, operating means for opening and closing said contacts, a spring biased actuating member releasable to effect opening of said contacts, a plurality of load terminals each electrically connected to the same one of said pair of contacts, a line terminal connected to the other of said pair of contacts, tripping mechanism including a tripping member having a normal position in which it restrains said actuating member and movable to a tripping position for effecting release of said actuating member to automatically open said contacts, a plurality of bimetallic trip elements one for each load terminal each connected in circuit between its corresponding load terminal and said one contact, each of said trip elements being operable when heated a predetermined amount by abnormal current flow therethrough to move said trip member to tripping position, said load terminals being electrically connected at different points to one wire of the branch circuit whereby current is fed through said pair of contacts into said one wire of the branch circuit at a plurality of different points.

15. In combination, a branch circuit, a circuit interrupter for controlling said branch circuit comprising a pair of cooperating contacts movable to open and to closed positions, a line terminal connected to one contact of said pair, a plurality of load terminals, tripping means for causing opening of said pair of contacts including a plurality of electro-responsive trip devices each electrically connected between a different one of said load terminals and the other contact of said pair and each of said electro-responsive trip devices being traversed only by the current through the one load terminal to which it is connected, said load terminals each being electrically connected at a different point to one wire of the branch circuit whereby current is fed through said pair of contacts into said one wire of the branch circuit at a plurality of different points and said trip devices provide overload protection for different portions of the branch circuit.

16. In combination, a branch circuit, a circuit breaker for controlling said branch circuit comprising a pair of cooperating contacts movable to open and closed positions, a line terminal connected to one of the contacts of said pair, a plurality of load terminals, tripping means for causing opening of said pair of contacts including a plurality of electro-responsive trip devices each electrically connected between a different one of said load terminals and the other contact of said pair, manually operable means for actuating said pair of contacts to open and close the circuit through all of said load terminals by means of the same pair of cooperating contacts, each of said electro-responsive trip devices being traversed only by the current through the load terminal to which it is connected and being operable to cause opening of said pair of contacts upon the flow of a predetermined abnormal current through the one of said load terminals to which it is connected, said load terminals being electrically connected to different points of one wire of the branch circuit whereby current is fed through said pair of contacts into said one wire at a plurality of different points.

17. A circuit breaker for controlling a loop circuit comprising a pair of relatively movable contacts, operating means for opening and closing said contacts, a trip mechanism including a pair of electro-responsive trip elements each having one terminal electrically connected to one terminal of the other and said connected terminals being connected to one of said contacts, the other terminals of said elements being electrically connected to the opposite ends of one wire of the loop circuit whereby current is fed through said single pair of contacts into both ends of one wire of the loop circuit.

18. A circuit breaker for controlling a loop circuit comprising a pair of relatively movable contacts, operating means for opening and closing said contacts, a spring biased actuating member normally held in one position during normal operation of said contacts, said spring biased member being releasable to effect automatic opening of said contacts, tripping mechanism including a movable tripping member having a normal position for restraining said actuating member and movable to a tripping position to release said actuating member, a plurality of bimetallic trip elements having one terminal of each electrically connected to one contact of said pair of contacts, the other terminals of said trip elements being connected to different points of one wire of the loop circuit whereby current is fed through said pair of contacts into said one wire of the loop circuit at a plurality of points, each of said trip elements being movable in response to predetermined current conditions in the portion of circuit in which it is connected to move said tripping member to tripping position, and means for individually adjusting the trip characteristic of each of said trip elements.

19. A circuit breaker for controlling a loop circuit comprising a pair of relatively movable contacts, a plurality of load terminals, tripping mechanism including a plurality of electro-responsive trip elements one for each load terminal, each trip element being electrically connected to its corresponding load terminal and to the same one of said contacts, and each trip element being operable in response to predetermined conditions to cause said tripping mechanism to effect automatic opening of said contacts, said load terminals being electrically connected to different points of one wire of said loop circuit whereby current is fed through said pair of contacts to different points of said one wire of the loop circuit.

20. A circuit breaker for controlling a loop circuit comprising a pair of relatively movable contacts, operating mechanism for opening and closing said contacts, a pair of load terminals, tripping mechanism including a pair of current responsive thermal trip elements, each trip element being electrically connected to its corresponding load terminal and to the same one of said contacts and operable in response to predetermined conditions to cause said tripping mechanism to effect automatic opening of said contacts, said load terminals being electrically connected to the opposite ends of one wire of said loop circuit whereby current is fed through said pair of contacts into both ends of said one wire of the loop circuit.

OLIVER S. JENNINGS.